Nov. 15, 1966  S. LA VAR HOWARD  3,286,260
ELECTRONIC SCANNING RADAR SYSTEM
Filed Feb. 7, 1964  2 Sheets-Sheet 1
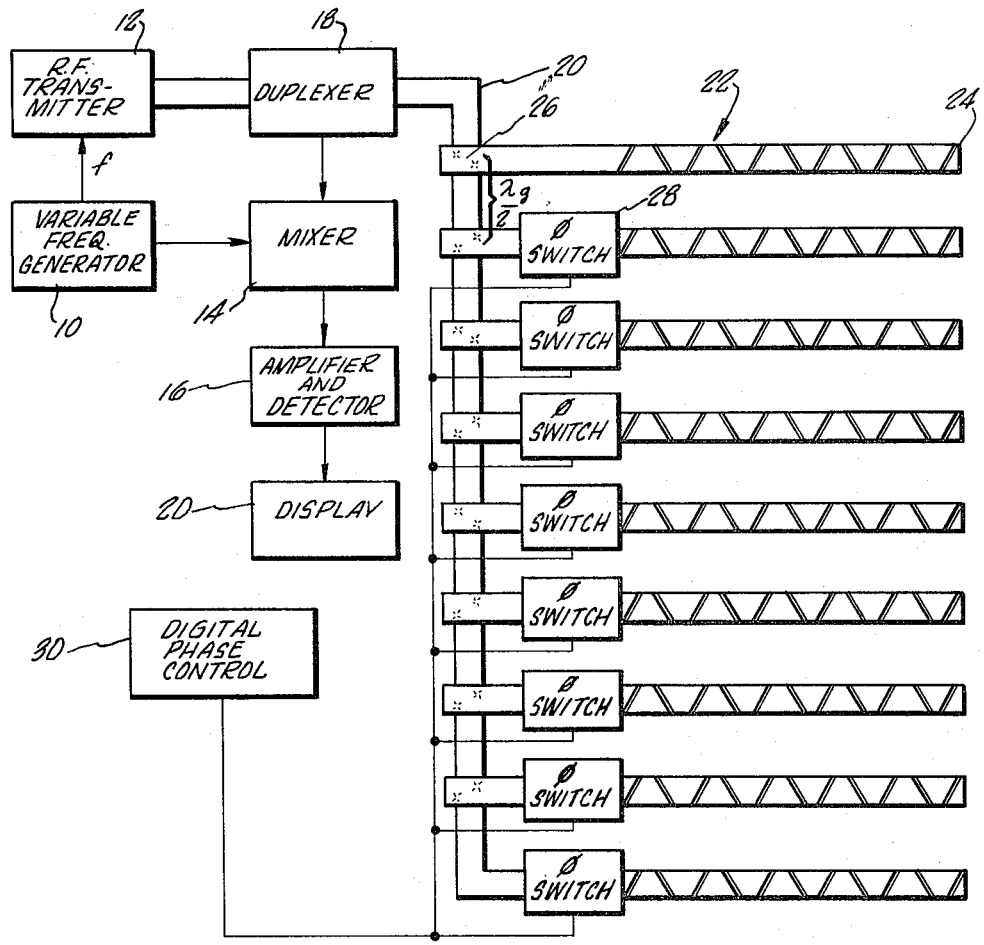
FIG_1.
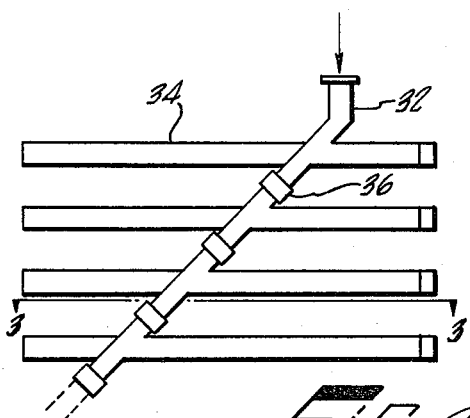
FIG_2.
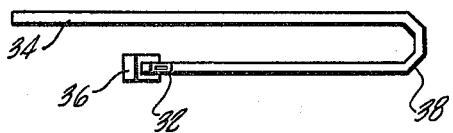
FIG_3.
INVENTOR.
SHIRLY LaVAR HOWARD
BY
Christie, Parker & Hale
ATTORNEYS

INVENTOR.
SHIRLY LA VAR HOWARD

United States Patent Office 3,286,260
Patented Nov. 15, 1966

3,286,260
ELECTRONIC SCANNING RADAR SYSTEM
Shirly La Var Howard, 4436 Santa Bella Road,
Rolling Hills Estates, Calif.
Filed Feb. 7, 1964, Ser. No. 343,274
4 Claims. (Cl. 343—100)

This invention relates to radar systems and, more particularly, is concerned with a microwave beam scanning antenna. Broadside antenna arrays are well known for transmitting and receiving highly directional microwave beams. The direction of the beam of such broadside arrays can be shifted by changing the relative phase of energy radiated from successive elements of the array. A change in relative phase between adjacent elements may be obtained by a change in frequency. If the radiating elements, for example, are coupled to spaced points along a transmission line, by changing the wavelength of the signal, the phase of the various elements are shifted with respect to each other. By making the path length between radiating elements longer in terms of the number of wavelengths at the center frequency, the amount of frequency change required to produce a given phase shift, and hence a given angular deviation of the radiated beam, is reduced. Thus, it has been the practice in the past in frequency scanning antenna arrays to use some sort of serpentine shape transmission line to feed the radiating elements of the array. The serpentine shape is required in order to maintain relatively close spacing required between radiating elements while increasing the transmission path length between elements. The serpentine shape of course increases the losses sharply in the transmission line feed. At the same time, the band width requirements of such a system are still undesirably large.

Electronic scanning antenna arrays have also been developed using phase shifting devices for changing the phase at the radiating elements. This requires some means for maintaining an accurate phase relationship between each of the elements while the phase is being shifted. Phase shifters which provide a rapid reciprocal phase shift, while available, are not particularly satisfactory. Ferrite devices have been used, for example, but these have very serious temperature stability problems, their power handling capacity is limited, and insertion losses are high.

The present invention is directed to an electronic scanning antenna which utilizes both phase shift and frequency change to provide a scanning beam. The present invention retains the advantages of both arrangements while avoiding the more serious problems of the two systems discussed above. This is accomplished, in brief, by providing an array of radiating elements which are fed in series from a common transmission line. The path length between radiating elements is relatively short in terms of wavelengths so that a change in frequency results in a relatively small amount of phase change at the radiating elements. Frequency scanning of the input signal thus provides a relatively small angle of scan of the radiated beam. The phase shifting elements, which switch in fixed increments of phase shift, are coupled between the transmission line and each of the radiating elements. The phase shifting elements shift the beam in incremental steps, which steps are made substantially equal to the maximum scan angle introduced by the frequency scanning of the input signal. Thus scanning of a large angle is produced by switching in incremental amounts of phase shift and utilizing frequency scan for fine adjustment of the scan angle between the incremental steps. This system has the advantage that a relatively narrow band width is required for the frequency scan, phase shifters can be used which are not temperature sensitive and which have substantially no loss. At the same time, the system permits selection of different frequencies to cover a given scan angle by providing separate control of frequency and phase shift.

For a more complete understanding of the invention, reference should be made to the accompanying drawings wherein:

FIGURE 1 is a diagrammatic showing of one embodiment of the present invention;

FIGURE 2 is a diagrammatic showing of an alternative embodiment of the antenna array;

FIGURE 3 is a top view of the array shown in FIGURE 2;

Figure 4:
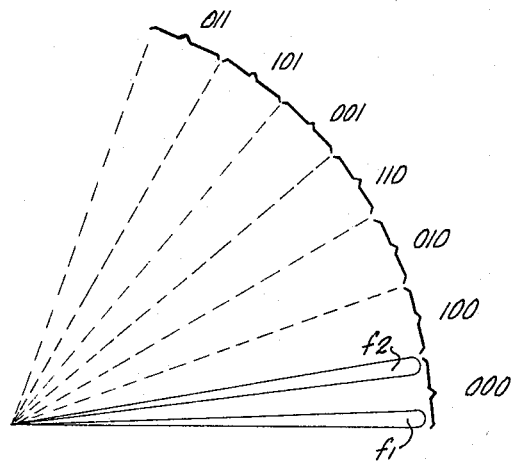
FIGURE 4 is a diagram of the antenna scan pattern.

Referring to FIGURE 1 in detail, the numeral 10 indicates generally a variable frequency generator. The generator provides an exciter frequency for a microwave transmitter 12. The generator 10 also provides a local oscillator frequency of a heterodyne receiver including a mixer 14 and an IF amplifier and detector circuit 16. A duplexer 18 isolates the mixer 14 from the RF transmitter 12. The output from the amplifier and detector 16 may be a suitable radar display 20. The arrangement as thus far described is a conventional radar system in which the output frequency can be varied over a limited range.

Figure 5:
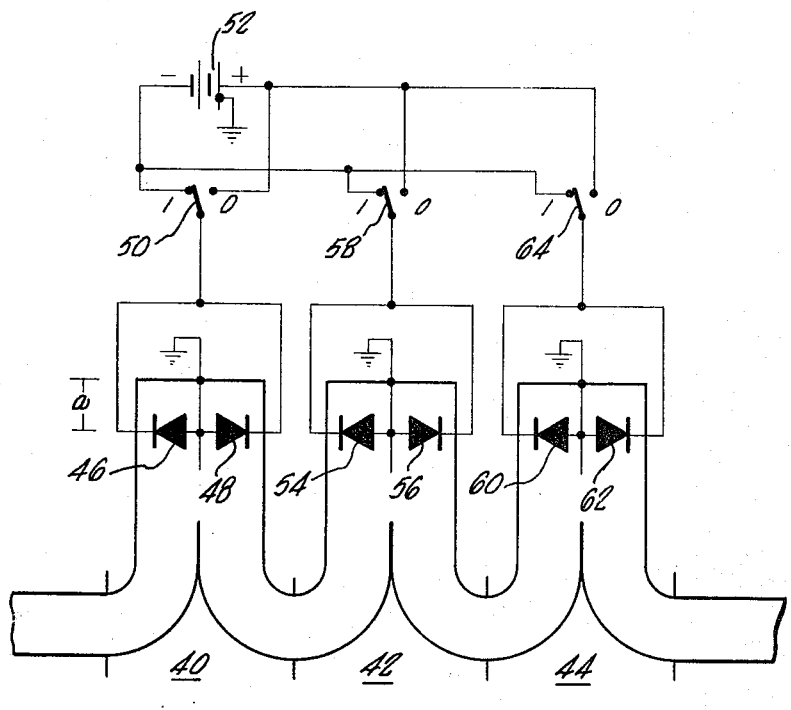
FIGURE 5 is a schematic showing of one type of phase switching unit.

The output from the duplexer 18 is coupled by means of a wave guide feed 20 to the antenna system indicated generally at 22. The antenna is preferably in the form of a broadside antenna array including a plurality of parallel slotted wave guide radiators indicated at 24. The wave guide 20 provides series feed to each of the radiators 24 through a plurality of junctions 26 which may be T-junctions or preferably directional couplers. All but the first radiator are coupled to the wave guide feed through a phase shifter 28. The phase shifters 28, which are described in detail in connection with FIGURE 5, are controlled from a digital phase control 30 by which predetermined incremental amounts of phase shift can be introduced simultaneously into the feed of each of the radiators.

In order to reduce the side-lobe energy of the array, the radiating elements of the array should be less than a free-space wavelength $\lambda_s$ apart for a beam normal to the array. In the arrangement of FIGURE 1, by reversing the phase at alternate junctions 26, i.e., introducing an additional 180° phase shift at every other junction, or in the associated phase shift unit 28, and making the path length between the junctions 26 a half a guide wavelength $\frac{1}{2}\lambda_g$, the radiated energy from all the radiators can be in phase. At the same time, because the guide wavelength $\lambda_g$ is normally longer than the free-space wavelength $\lambda_s$, the radiating elements are physically spaced less than a free-space wavelength $\lambda_s$ apart but greater than a $\frac{1}{2}\lambda_s$ apart. The radiating slots in each of the radiators 24 are spaced a $\frac{1}{2}\lambda_g$ with an alternating slope to provide a phase reversal between adjacent slots, so that the slots radiate in phase.

It will be evident that the array is frequency sensitive in both elevation and azimuth because of the fixed spacing between radiators and between slots in each radiator. Frequency change thus produces a diagonal scan of the beam. The diagonal scan could be avoided of course by using another type of radiating array. For example, the phase shifter could feed into separate horns directed toward a parabolic reflection.

In the alternate design shown in FIGURES 2 and 3, the feed is arranged so as to extend at an angle to the radiators. Thus, as shown in FIGURE 2, the input wave guide 32 to the antenna extends diagonally in relation to the radiators 34. If the direction of feed is as shown by the arrow to the guide 32, the path length between radiators is increased in sensitivity. However, if the feed is into the opposite end of the guide 32, the path length between is effectively reduced and therefore the frequency sensitivity is made less.

In addition, the arrangement of FIGURES 2 and 3 provide phase shifters 36 in the diagonal wave guide feed 32 rather than in the branch feed lines to the individual radiators as in the arrangement of FIGURE 1. This permits each of the phase shifters to introduce equal increments of phase shift.

One other feature of the arrangement of FIGURES 2 and 3 is that the branch feed lines to the radiators 34 are folded through a 180° bend as indicated at 38 in FIGURE 3. This provides a more compact construction of the antenna, permitting the input feed line 32 to lie in a plane behind the plane of the broadside array.

Referring to FIGURE 5, a suitable phase shift switch is shown. The switch is shown as including three short-slot hybrid junctions 40, 42 and 44. Two of the four arms of each of the hybrid junctions are terminated in a short circuit. A pair of diodes 46 and 48 in the short circuited arms of the hybrid junction 40 are positioned a distance $a$ from the shorted terminations. The diodes 46 and 48 are connected to a common switch 50 by means of which the diodes are connected to one end or the other of a center-tapped bias potential source 52. If the switch 50 is in the 0 position, the diodes 46 and 48 are back-biased, permitting the input energy to pass beyond the diodes to the end of the short circuited arms. With the switch 50 in the 1 position, the diodes 46 and 48 are forward biased and the microwave energy is reflected from the point of the diodes thus reducing the path length of the microwave energy by a factor of $2a$. Depending upon the wavelength of the microwave energy in the wave guide, the change in path length changes the phase of the energy of the output of the first junction by some predetermined amount.

The hybrid junction 42 is similarly provided with a pair of diodes 54 and 56 which are biased from the source 52 by means of a switch 58. The diodes 54 and 56 are positioned a distance $2a$ from the shorted ends of the associated arms of the hybrid junction 42. Similarly the hybrid junction 44 is provided with a pair of diodes 60 and 62 which are connected to the source 52 through a switch 64. The diodes are spaced a distance $4a$ from the short circuited termination of the associated arms of the hybrid junction 44. The three switches 50, 58 and 64 can be set to provide eight equal increments of additional phase shift through the three hybrid junctions. The same three switches 50, 58, and 64 can be used to control the diodes in all the other phase shifters of the array, so that the correct phase shift can be provided simultaneously in all the radiators to control beam scan angle.

Referring to FIGURE 4, the scanning pattern of the beam in elevation is shown. Thus for a setting of the switches 50, 58, and 64 of 000, the beam is scanned over an angle pulse indicated at 000 in FIGURE 4. The beam is much narrower than this angle and is scanned through this angle by a change in frequency of the frequency generator 10 from a value $f_1$ to $f_2$. As further shown in FIGURE 4, with the switches set to correspond to the values 100, the beam is scanned through an angle designated 100 in FIGURE 4, by shifting the frequency over a range from $f_1$ to $f_2$. Similarly the beam can be scanned over other sectors by setting the three switches to any of the other possible binary combinations.

The above described arrangement of the present invention, in which coarse scanning is done in incremental steps by switching in phase shift, and fine scanning is done by varying the frequency, provides a number of advantages over other electronic scanning systems. The fine scanning by frequency change covers only a small fraction of the total scan angle, thus permitting short lengths of transmission line between radiators to obtain the frequency sensitivity required. The shorter feed line requires few bends, greatly reducing reflection and energy loss along the line. Narrower pulses can be transmitted by this system than by conventional electronic scan systems because the shorter length of feed line lessens the time required for the pulse to completely illuminate all the radiators.

At the same time, the phase shifters need not be continuously variable and can be arranged, as described, to merely switch in additional lengths of transmission line. Temperature instability and power loss usually associated with variable phase shifters normally incorporated in scanning systems is thus avoided.

It should be further noted that by combining frequency scan and phase scan in one system, different frequencies can be used to scan over the same sector merely by changing the amount of phase shift introduced into the system by the phase shifters.

In a broadside array producing a pencil beam, the antenna may be rotated in azimuth while the beam is electronically scanned in elevation. Using the present invention, when the frequency is changed, the beam is shifted in azimuth angle as well as elevation, but when the phase is changed, the azimuth angle is unaffected. This may be used to advantage to hold the beam at one azimuth angle for an extended period without interrupting the rotation of the array. Normal scan is arranged by selecting the phase and frequency such that the beam is advanced in azimuth from the normal to the array. At any particular azimuth angle, the frequency and phase can be simultaneously changed to move the beam back in azimuth toward the normal and then on to a delayed angle. This can be done at a rate such that the rate of change of azimuth angle exactly balances the rotational scanning rate of the array. In this manner, the beam appears to momentarily stand still at a particularly azimuth angle, permitting more energy to be transmitted at a selected azimuth.

What is claimed is:

1. A scanning antenna system comprising a plurality of radiating elements, waveguide means for coupling each element to a source of energy, the waveguide means including a single tranmission path, a plurality of junctions spaced along the transmission path, a plurality of phase shift elements, there being one phase shift element associated with each radiating element and coupling the radiating element to an associated one of the junctions, means for simultaneously varying the amount of phase shift introduced by each of the phase shift elements in incremental amounts, whereby the direction of the radiated beam can be shifted in angle in incremental steps, and means for changing the frequency of the energy from the source to scan the beam over an angle corresponding to the incremental beam angle produced by the phase shifting elements.

2. A scanning antenna system comprising a source of microwave energy, means for varying the frequency of the microwave energy over a small range, a straight length of waveguide transmission line coupled at one end to the source, a plurality of T-junctions along the line at intervals approximately equal to a wavelength of the microwave energy, a plurality of radiating elements each coupled to corresponding ones of the T-junctions, whereby energy is fed to the radiating elements in series-feed, a plurality of adjustable phase shift devices, at least one phase shift device being connected in the energy transmission path between the source and the radiating elements except the first element nearest the source, each phase shift device including means for adjusting the amount of phase shift in predetermined incremental steps, and means for simultaneously stepping all of the phase shift devices to shift the phase of the energy emitted by each radiating element.

3. A scanning antenna system comprising a source of microwave energy, means for varying the frequency of the microwave energy over a small range, a straight length of wave guide transmission line coupled at one end to the source, a plurality of T-junctions along the line, a plurality of radiating elements each coupled to corresponding ones of the T-junctions, whereby energy is fed to the radiating elements in series-feed, and a plurality of adjustable phase shift devices, at least one phase shift device being connected in the energy transmission path between the source and the radiating elements except the first element nearest the source, each phase shift device including means for adjusting the amount of phase shift in predetermined incremental steps.

4. An antenna system comprising an array of radiating elements for producing a radiated microwave beam, a linear waveguide providing a common feed to each of the elements of the array, means for shifting the phase of microwave energy at each of the radiating elements relative to the phase of the energy at the other elements, said phase shifting means including means for shifting the phase in controlled steps to change the angle of the beam radiated by said elements in controlled angular steps, means for applying microwave energy to said waveguide to feed energy to each of the radiating elements, and means for varying the frequency of the microwave energy sufficiently to change the angle of the beam by an amount equal to one of said controlled angular steps.

References Cited by the Examiner

UNITED STATES PATENTS 3,041,605  6/1962  Goodwin et al.

CHESTER L. JUSTUS, *Primary Examiner.*

T. H. TUBBESING, *Assistant Examiner.*